United States Patent
Sung et al.

(10) Patent No.: US 12,255,808 B2
(45) Date of Patent: *Mar. 18, 2025

(54) METHODS AND SYSTEMS FOR SENDING PACKETS THROUGH A PLURALITY OF TUNNELS

(71) Applicant: Pismo Labs Technology Limited, Kowloon (HK)

(72) Inventors: Patrick Ho Wai Sung, Kowloon (HK); Kam Chiu Ng, New Territories (HK); Wan Chun Leung, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 247 days.

This patent is subject to a terminal disclaimer.

(21) Appl. No.: 17/839,444

(22) Filed: Jun. 13, 2022

(65) Prior Publication Data

US 2022/0311701 A1 Sep. 29, 2022

Related U.S. Application Data

(63) Continuation of application No. 16/882,486, filed on May 24, 2020, now Pat. No. 11,362,933, which is a
(Continued)

(51) Int. Cl.
*H04L 45/24* (2022.01)
*H04L 12/46* (2006.01)

(52) U.S. Cl.
CPC .......... *H04L 45/24* (2013.01); *H04L 12/4633* (2013.01); *H04L 45/245* (2013.01); *H04L 2212/00* (2013.01)

(58) Field of Classification Search
None
See application file for complete search history.

(56) References Cited

U.S. PATENT DOCUMENTS

| 10,348,652 B2 | 7/2019 | MacNeil et al. |
| 2012/0033673 A1 | 2/2012 | Goel |

(Continued)

FOREIGN PATENT DOCUMENTS

| CN | 101217467 A | 7/2008 |
| CN | 106664258 A | 5/2017 |

(Continued)

OTHER PUBLICATIONS

Office Action in related Chinese Application No. 201980008452.5, mailed on Nov. 8, 2021.
(Continued)

*Primary Examiner* — Christine T Duong
(74) *Attorney, Agent, or Firm* — Hershkovitz & Associates, PLLC; Abe Hershkovitz

(57) ABSTRACT

Described in example embodiments herein are methods and systems for implementing sending packets from a first network node to a second network node. Packets belonging to the same session may be sent through the same or different tunnels. The second network node processes packets belonging to the same session using the same core. In accordance with an example embodiment, the first network node informs the second network code the core to process the packets. Optionally, selection of core at the second network node is assisted by a core identity created by the first network based on the session. The core identity may be stored in the header or payload of the packets. In an example embodiment, the second network determines the core for processing packet belonging to the same session.

20 Claims, 10 Drawing Sheets

Related U.S. Application Data continuation of application No. PCT/IB2019/052743, filed on Apr. 4, 2019.

(56) References Cited

U.S. PATENT DOCUMENTS

| | | | |
|---|---|---|---|
| 2016/0043969 A1* | 2/2016 | Sung | H04L 69/16 370/392 |
| 2016/0277358 A1* | 9/2016 | Ambati | H04L 63/1466 |
| 2016/0315853 A1 | 10/2016 | Liste | |
| 2017/0244637 A1 | 4/2017 | Singhal | |
| 2018/0213440 A1 | 7/2018 | Mahapatra | |
| 2018/0219805 A1 | 8/2018 | MacNeil et al. | |
| 2018/0287902 A1 | 10/2018 | Chitalia et al. | |
| 2019/0173841 A1* | 6/2019 | Wang | G06F 9/5083 |

FOREIGN PATENT DOCUMENTS

| | | |
|---|---|---|
| CN | 108228366 A | 6/2018 |
| CN | 109067667 A | 12/2018 |

OTHER PUBLICATIONS

English language Abstract of CN 109067667 A (Dec. 21, 2018).
English language Abstract of CN 106664258 A (May 10, 2017).
English language Abstract of CN 101217467 A (Jul. 9, 2008).
International Search Report in International Application No. PCT/IB2019/052743, mailed on Dec. 27, 2019.
Written Opinion of the International Searching Authority in International Application No. PCT/IB2019/052743, mailed on Dec. 27, 2019.
English language Abstract of CN 108228366 A (Jun. 29, 2018).

* cited by examiner

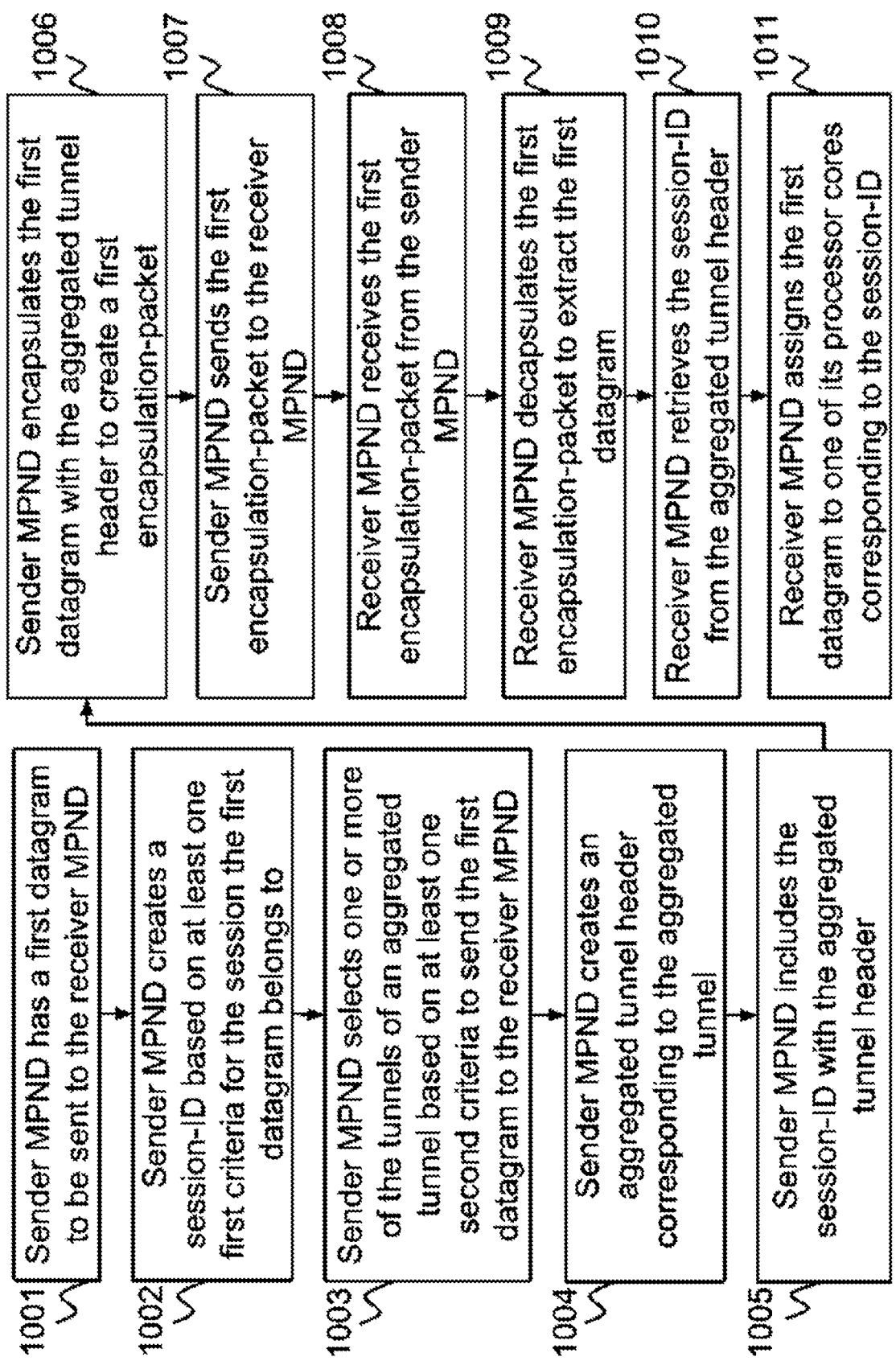

METHODS AND SYSTEMS FOR SENDING PACKETS THROUGH A PLURALITY OF TUNNELS

RELATED APPLICATIONS

The present application is a non-provisional continuation application, which claims the benefits of and is based on U.S. patent application Ser. No. 16/882,486 filed on May 24, 2020, which is a Bypass Continuation of International Application No. PCT/IB2019/052743 filed on Apr. 4, 2019, the disclosures of which are hereby incorporated by specific reference thereto.

TECHNICAL FIELD

Embodiments of the present invention relate to the field of network data communications at a network device, and specifically, to select computing cores of the network device to process packets sent through a plurality of tunnels.

BACKGROUND ART

A multi Wide Area Network (WAN) site-to-site VPN router is a router that supports aggregating bandwidth of a plurality of WAN connections by forming an aggregated tunnel. This type of routers is referred to as MPND router hereinafter. A MPND router may establish a plurality of aggregated tunnels with a plurality of network nodes. Selection of WAN connections for a particular aggregated tunnel may be determined based on various factors such as, but not limited to, source IP address, destination IP address, source port number, destination port number, content of application data, Quality of Service (QoS) requirement of the applications, time and date, user-ID, bandwidth, latency or hop-count of the connected links etc. individually or in any combination thereof. Commonly these MPNDs have the capability to add or remove WAN connections as needed during data transfer. Determining the WAN connections to be comprised in an aggregated tunnel may be performed by an administrator/user or by the router itself according to real-time requirements.

An MPND may be implemented with one processing-unit or a plurality of processing-units, such as multiprocessor devices. A processing-unit may have a plurality of cores. The use of a plurality of cores may provide improved performance by sharing the load of processing network datagrams or packets. MPNDs may simultaneously handle traffic received from many applications running on numerous host machines such as desktop/laptop computers, servers, smart-phones, and more recently IoT devices etc. Different cores in the MPND may have different processing performance due to different factors, including processing load. Indiscriminately allocating the received datagrams or packets to the cores may result in consecutive packets of a particular data session being processed by different cores. This may then result in out out-of-order datagrams or packets progressing and lower overall throughput of the particular data session.

SUMMARY OF THE INVENTION

The present invention discloses methods and systems to improve the rate of processing of datagrams at a receiver MPND by assigning each received datagram to a determined core of the processor of the receiver MPND. The determination is made by matching each received datagram against a criterion or criteria. Datagrams that satisfy a particular criterion or a set of criteria are associated with a particular session. Datagrams belonging to the same session is assigned to the same core. This conditional assignment reduces re-ordering of datagrams which, as a result, reduces packet-drops and increases the overall data throughput rate of the receiver MPND.

In one embodiment, the receiver MPND associates a received datagram to a particular session based on values of one or more of the header fields, or the content of the payload contained in the datagram. In this embodiment, the sender MPND is not required to know the processor information comprised in the receiver MPND. The processor information of a receiver MPND may include, but not limited to, the number of cores comprised within the receiver MPND. Value or status of any parameter that is associated with the cores may also be included in the processor information. In this particular embodiment, the receiver MPND assigns the received datagrams to its cores independently from the sender MPND.

In one embodiment, the sender MPND receives the Processor information of the receiver MPND prior to sending the datagram. In this embodiment, the sender MPND determines which core the receiver MPND should assign the received datagram to. The sender MPND then sends the corresponding instruction to the receiver MPND.

In one embodiment, tunnels are used to create connection-oriented communication links between the sender MPND and the receiver MPND. The tunnels are established at the sender MPND based on a criterion. Each datagram destined for the receiver MPND is then encapsulated with the tunnel header creating a new datagram (referred to as "encapsulation packet" herein). Each encapsulation packet is then sent to the receiver MPND. After receiving each encapsulation packet, the receiver MPND determines a core to which the received encapsulation packet will be assigned to. There is no limitation on how this determination is made by the receiver MPND.

In one embodiment where tunnels are used to send datagrams from the sender MPND to the receiver MPND, the sender MPND receives the PI of the receiver MPND prior to sending the datagram. In this embodiment, the sender MPND determines which core the receiver MPND should assign the received encapsulation packet to.

In one embodiment, the sender MPND and the receiver MPND are able to send and receive datagrams using aggregated tunnels as used by MPNDs. In this embodiment encapsulation packets are created by encapsulating each datagram with the aggregated tunnel header. Each encapsulation packet is then sent to the receiver MPND. After receiving each encapsulation packet, the receiver MPND determines a core to which the received encapsulation packet will be assigned to.

In one embodiment where the sender MPND and the receiver MPND uses aggregated tunnels to transmit and receive datagrams, the sender MPND receives the processor information of the receiver MPND prior to sending the datagram. In this embodiment, the sender MPND determines which core the receiver MPND should assign the received encapsulation packet to.

The one or more criteria used to assign the received datagrams to a particular core is related to the one or more condition based on which the tunnel is formed. In one embodiment, the receiver MPND assigns inbound data units to a core with less processing load to reduce processing-delay. The term "data unit" used herein refer to any Protocol Data Unit (PDU). For consistency, only the term "datagram"

is used hereinafter to refer to such PDU. Although the present invention describes methods and systems to conditionally allocate datagrams to cores of a multicore system, one of ordinary skill in the art would appreciate that the methods and systems detailed herein can be applied to any computing system with a plurality of processors such as a single multicore processor, a plurality of single core processors, a plurality of multicore processors and the like.

DETAILED DESCRIPTIONS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims. Thus, the embodiment(s) are not to be limited to those shown, but are to be accorded the widest scope consistent with the principles and features described herein.

For purpose of clarity, details relating to technical material that is known in the technical fields related to the embodiment(s) have not been described in detail. Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a session diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing-unit for performing functions and operations as described herein. The program instructions making up the various embodiments may be stored in a non-transitory storage medium. Moreover, as disclosed herein, the term "non-transitory storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The term "non-transitory computer-readable medium", "main memory", or "secondary storage", as used herein refers to any medium that participates in providing instructions to a processing-unit for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by processing-unit. A non-volatile storage or static storage may be used for storing static information and instructions for processing-unit, as well as various system configuration parameters.

The storage medium may include a number of software modules that may be implemented as software code to be executed by the processing-unit using any suitable computer instruction type. The software code may be stored as a series of instructions or commands, or as a program in the storage medium.

Various forms of computer readable media may be involved in carrying one or more sequences of one or more instructions to the processing-unit for execution. For example, the instructions may initially be carried on a magnetic disk from a remote computer. Alternatively, a remote computer can load the instructions into its dynamic memory and send the instructions to the system that runs the one or more sequences of one or more instructions.

A processor may be a microprocessor, a microcontroller, a digital signal processor (DSP), a central processing unit (CPU), a multiprocessor, a multi-core processor. A processor may also be an independent processor may have a plurality of processing unit called cores. A multiprocessor or a multi-core processor that share a common operating system, any combination of those devices, or any other circuitry configured to process information are also considered as a processor for this invention.

A processing-unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing-unit(s) can be realized by virtualization, and can be a virtual processing-unit(s) including a virtual processing-unit in a cloud-based instance.

Embodiments of the present invention are related to the use of a computer system for implementing the techniques described herein. In an embodiment, the inventive processing-units may reside on a machine such as a computer platform. According to one embodiment of the invention, the techniques described herein are performed by a computer system in response to the processing-unit executing one or more sequences of one or more instructions contained in the volatile memory. Such instructions may be read into the volatile memory from another computer-readable medium. Execution of the sequences of instructions contained in the volatile memory causes the processing-unit to perform the process steps described herein. In alternative embodiments, hard-wired circuitry may be used in place of or in combination with software instructions to implement the invention. Thus, embodiments of the invention are not limited to any specific combination of hardware circuitry and software.

A code segment, such as program instructions, may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

A network interface may be implemented by a standalone electronic component or may be integrated with other electronic components. A network interface may have no network connection or at least one network connection depending on the configuration. A network interface may be an Ethernet interface, a wireless communication interface, a frame relay interface, a fibre optic interface, a cable interface, a Digital Subscriber Line (DSL) interface, a token ring interface, a serial bus interface, a universal serial bus (USB) interface, Firewire interface, Peripheral Component Interconnect (PCI) interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMax, GPRS, EDGE, GSM, CDMA, WiFi, CDMA2000, WCDMA, TD-SCDMA, BLUETOOTH, WiBRO, Evolution-Data Optimized (EV-DO), Digital Enhanced Cordless Telecommunications (DECT), Digital AMPS (IS-136/TDMA), Integrated Digital Enhanced (iDEN) or any other wireless technologies.

Embodiments, or portions thereof, may be embodied in a computer data signal, which may be in any suitable form for communication over a transmission medium such that it is readable for execution by a functional device (e.g., processing-unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

FIG. 3 illustrates a typical network topology 3000 where a plurality of MPNDs may be connected together via groups of access networks. There is no limitation to the number of MPND that can be connected together. System 3000 is adapted according to embodiments configured to transmit and receive data through aggregated multiple connections, also herein referred to as "aggregated tunnel", according to the present invention. System 3000 includes multiple sites 307 and 311. Sites 307 and 311 each comprise at least one MPND 301 and MPND 302 respectively. Network 310 may comprise one or more of a local area network (LAN), metropolitan area network (MAN), wide area network (WAN), wireless network, the public switched telephone network (PSTN), the Internet, an intranet, an extranet, or other similar networks. Desktop computer 303 and laptop computer 305 are connected to network MPND 301 using connections 304 and 306 respectively. File server 315 and database server 309 are connected to MPND 302 using connections 308 and 313 respectively. There is no limitation that only desktop computers, laptop computers, file servers and database servers can connect to MPNDs 301 and 302. Any electronic device with networking capability may connect to MPNDs 301 and 302.

Access networks 312 and 314 are data connections for communicating information within network 310 between sites 307 and 311. These number of access networks are shown only for illustration. A person skilled in the art would appreciate that any number and arrangement of access networks are possible to be adapted by MPNDs 301 and 302. Access networks 312-1, 312-2, 312-3, 314-1 and 314-2 may have similar or different network characteristics, including packet loss rate and bandwidth capabilities. Further, access networks 312 and 314 may comprise different types of network connections, such as a WiFi, fiber optics, cable, DSL, T1, 3G, 4G, 5G, satellite connections, Ethernet, ATM, and the like. It is also noted that MPNDs 301 and 302 may be thought of as both a sender or receiver, and discussions regarding the functionality of either site may be implemented on the other site. In other words, system 3000 may be implemented as a symmetrical network with bidirectional data transfer capabilities.

When establishing an aggregated connection between MPNDs 301 and 302, such as by implementing an aggregated site-to-site VPN connection, a plurality of tunnels 316 may be created. The plurality of tunnels 316 correspond to a unique permutation of the WAN connections 312 of site 307 and the network connections 314 of site 311. One or more of the plurality of tunnels 316 may be established through networks 310 between MPNDs 301 and 302. There is no limitation that the plurality of tunnels 316 must be two per access networks 312 or three per access networks 314. There is no limitation that both MPND 301 and 302 must have a plurality of WAN ports or must connect to a plurality of WAN connections. However, at least one of MPND 301 and 302 must connect to a plurality of WAN connections through a plurality of WAN interfaces or ports.

FIG. 6 is an illustrative block diagram of a router 6000, which has similar functionalities to MPNDs 301 and 302, according to one of the embodiments of the present invention. Router 6000 comprises processor 600, main memory 601, system bus 602, secondary storage 603, and network interfaces 604, 605, 606 and 607. Processor 600 and main memory 601 are connected to each other directly. Processor 600 is connected to secondary storage 603 and network interfaces 604, 605, 606 and 607 through system bus 602.

System bus 602 can be any of several types of bus structures including a memory bus, a peripheral bus, and a local bus using any of a variety of bus architectures. Secondary storage 603 stores program instructions for execution by processor 600. Processor 600 comprises a plurality of cores as processing units. For illustration purpose only, processor 600 has two cores, namely core 600a and core 600b. Those who are skilled in the art would appreciate that processor 600 is not limited to have only two cores, but may also have more than two cores. The scope of the invention is not restricted to router 6000 having four network interfaces, such that router 6000 is allowed to have network interfaces higher or below this number. Moreover, router 6000 is not limited to have only one processor 600, but may also have a plurality of processors.

It shall be appreciated that the present disclosure is not limited to the architecture of system 6000. For example, any suitable processor based device may be utilized for implementing the above teachings, including without limitation routers, personal computers, laptop computers, computer workstations, multiprocessor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

A access network connects a network interface of a network device such as MPND to interconnected networks, such as the Internet. The network interface can be an Ethernet interface, a 3G/4G/5G network interface, a WiMAX network interface, or any other network interface of a network device. A network interface can also be a virtual network interface of a virtual machine (VM). A access network is in form of optical fiber, Ethernet, ATM, Frame Relay, T1/E1, IPv4, IPv6, wireless technologies, Wi-Fi, WiMAX, High-Speed Packet Access technology, 3GPP Long Term Evolution (LTE) or the like.

An end-to-end connection is a connection between a source node and a destination node. An end-to-end connection may include one or more access networks and one or more intermediate nodes. In one of the embodiments of the present invention, an end-to-end connection between a source node and a destination node is a virtual private network (VPN) tunnel.

A tunnel is an end-to-end connection established between two MPNDs using their respective tunnel interfaces and one or more access networks. A tunnel is established using a tunnelling protocol that encapsulates one type of protocol data unit (PDU) into another type of protocol data unit. Examples of tunnelling protocols include, but are not limited to, Generic Routing Encapsulation (GRE) and Layer-2 Tunneling Protocol (L2TP). A tunnel creates a virtual point-to-point connection between two network nodes. Tunnels may or may not encrypt the encapsulated PDU such as an IP packet. More than one tunnel interface can be established using the same network interface of a MPNS. The two MPNDs on each end of a tunnel may be directly connected or may be connected through one or more interconnected networks.

An information packet is a PDU that contains control information, such as address information, and user data. An information packet can be a network layer PDU such as Internet Protocol (IPv4 or IPv6), a transport layer PDU such as Transmission Control Protocol (TCP) or User Datagram Protocol (UDP), or PDU of any other protocol that is capable of carrying information over a access network.

Data flow, session and data session are considered as interchangeable in the present invention. For example, a multimedia data session or session is a set of multimedia senders and receivers and the data streams flowing from senders to receivers. A multimedia conference is an example of a multimedia data session or flow.

FIG. 1 and FIG. 4 should be viewed in conjunction with network architecture diagram FIG. 3. FIG. 1 and FIG. 4 illustrate steps performed by receiver MPND 302 and sender MPND 301 respectively according to one embodiment of the present invention. In this embodiment, receiver MPND 302 relies on a core identity in datagrams to select a core to process the received datagram. The core identity may be in the form of a string, a number, a hash, a code or any data format that is recognizable by sender MPND 301 and receiver MPND 302. In case there is no core identity in a datagram, receiver MPND 302 will inform sender MPND 301 the core identity for future datagrams belonging to the same flow of the datagram.

At step 102, receiver MPND 302 receives a first datagram from one of access networks 312 and 314. At step 103, receiver MPND 302 determines whether the first datagram belongs to a new session or a session already having one or more datagrams received.

The session is identified based on a data session identification process. The data session identification process may be based on, but not limited to core identity, source IP address, destination IP address, source port number, destination port number, connection-state, payload-content, quality of service (QoS) requirement of the applications, time and date, user-ID, bandwidth, latency or hop-count of the connected links etc. individually or in any combination thereof.

If the datagram belongs to a new session, at step 104, receiver MPND 302 assigns a core to process datagrams of the new session. The new session comprises the first datagram and to be received datagrams of the new session. Receiver MPND 302 also creates or assigns a core identity corresponding to the assigned core.

At step 105, receiver MPND 302 informs sender MPND 301 the identity of the core assigned. There is no limit that step 104 must be performed immediately after step 103. For example, step 104 may be performed after step 107. In one variance, step 104 may be performed after one or more datagrams belonging to the new session have arrived at receiver MPND 302.

There is no limit that all datagrams belonging to a session must be sent by the same WAN interface of sender MPND 301 or must be sent through the same path, or must be received by the same network interface at receiver MPND 302. It is preferred that all datagrams of the new session, except the first one datagram or the first few datagrams, are sent by sender MPND 301 along with the core identity If one or more datagrams belonging to a session already have already arrived at the receiver MPND 302, at step 106, receiver MPND 302 then determines the core based on prior core assignment of the session the first datagram belongs to. When there is a core identity stored in the first datagram, receiver MPND 302 will assign the core corresponding to the core identity to process the first datagram.

At step 107, receiver MPND 302 processes the datagram using the core assigned. The processed datagram will then be forwarded to the corresponding destination, such as receiver MPND 302 or a device, such as file server 315 or database server 309, connected to MPND 302.

FIG. 4 illustrates steps performed by sender MPND 301 and receiver MPND 302 according to one embodiment of the present invention. The embodiment illustrated by FIG. 4 may be implemented together with the embodiment illustrated by FIG. 3 in a system or be implemented independently from FIG. 3. In this particular embodiment, sender MPND 301 has a core identity sent by receiver MPND 302 prior to sending the datagram. The core identity is to be used by the receiver MPND 302 as described in the embodiment of FIG. 1.

For all embodiments disclosed The processor information may be sent by receiver MPND 302, or pre-shared with sender MPND 301 by a user or administrator of the both MPND 302 and MPND 303, or from a remote management node.

At step 401, sender MPND 301 receives the core identity sent by receiver MPND 302 at step 105 from MPND 302 for a flow. In one variant, sender MPND 301 receives the core identity before sending the initial datagram of a new flow. In one variant, sender MPND 301 receives the core identity after sending the initial datagram or the initial few datagrams of a new flow.

At step 402, sender MPND 301 has a datagram to be sent to the receiver MPND 302. The datagram may be created by MPND 301 based on another datagram received from a device, such as desktop computer 303 and laptop computer 305, connected to MPND 301.

At step 403, sender MPND 301 puts the core identity, which corresponds to the core determined, into the datagram.

At step 404, sender MPND 301 sends the datagram to receiver MPND 302 through one of access networks 312.

There is no limitation whether the core identity is encrypted or not. There is also no limitation whether the core identity is stored in the header section or payload section of a datagram. In one example, sender MPND 301 encrypts the core identity and stores it at the header section of the datagram during step 403. Receiver MPND 302 then decrypts the encrypted core identity before assigning the first datagram to a core at step 106. In another example, the core identity is not encrypted. It is preferred that the core identity is not encrypted and stored in the header section of the datagram in order to reduce processing load.

FIG. 5 illustrates steps performed by sender MPND 301 and receiver MPND 302 according to one embodiment of the present invention. Comparing this embodiment to the embodiment illustrated by FIG. 1 and FIG. 4, datagrams to be sent by sender MPND 301 are encapsulated in encapsulation packets and are sent through an aggregated tunnel. FIG. 5 should be viewed in conjunction with FIG. 3.

At step 501, an aggregated tunnel is established between sender MPND 301 and receiver MPND 302. The aggregated tunnel may be established using one or more of access networks 312 and one or more access networks 314 through network 310. During the aggregated tunnel establishment stage, receiver MPND 302 sends sender MPND 301 a core identity.

At step 502, sender MPND 301 has a datagram to be sent to receiver MPND 302. The datagram may be received from a network node in a network connected to sender MPND 301 and designated to receiver MPND 302 or a network node in a network connected to receiver MPND 302. At step 503, sender MPND 301 creates an encapsulation packet by encapsulating the datagram with an aggregated tunnel header. In the aggregated tunnel header, the core identity is stored. The encapsulation packet may be an IP packet. The payload portion of the IP packet is unencrypted and holds the aggregated tunnel header and the datagram.

At step 504, sender MPND 301 sends the encapsulation-packet to receiver MPND 302. At step 505, receiver MPND 302 receives the encapsulation-packet from the sender MPND 301. At step 506, receiver MPND 302 examines the encapsulation packet and retrieve the core identity from the aggregated tunnel header. Then MPND 302 selects one of its cores based on the core identity to process the datagram, which is retrieved from the payload portion of the encapsulation packet.

Since in this particular embodiment, MPND 301 does not encrypt the payload of the encapsulation packet, receiver MPND 302 does not need to perform any decryption at step 506 to retrieve the core identity. At step 507, receiver MPND 302 assigns the encapsulation packet to a core corresponding to the core identity. The core will then process the encapsulation packet. Then receiver MPND 302 may send the datagram, which is in the payload of the encapsulation packet, to a corresponding receiving network node after the processing.

When more datagrams arrived at sender MPND 301 and are designated to receiver MPND 302 through the aggregated tunnel, steps 502 to 507 will repeat. Therefore core identities of tunnel headers of the encapsulation packets encapsulating the datagrams will be the same.

In one variant, during step 501, sender MPND 301 may also send receiver MPND 302 a core identity. When receiver MPND 302 has datagrams to be sent to sender MPND 301, receiver MPND 302 will also encapsulate the datagrams with that core identity in encapsulation packets and then send the encapsulation packets to sender MPND 301.

In one variant, receiver MPND 302 provides the core identity to sender MPND 301 prior to the transmission of data datagrams of a particular data session (e.g. using a handshake method) from sender MPND 301 to receiver MPND 302. In another variant, the core identity is predetermined and set by the administrator or a user. In another variant, sender MPND 301 receives or collects the core identity from a remote management node or from a data storage device. In one variant of this embodiment, only the number of total cores of the receiver node to be used to process datagrams, is shared with sender MPND 301. In another variant, the total number of cores comprised in receiver MPND 302 is shared with sender MPND 301 and sender MPND 301 determines the number of process-cores to be used.

In one variant, step 503 and step 506 are modified. At modified step of 503, sender MPND 301 encrypts the datagram and tunnel header and then stores both in the payload portion of an encapsulation packet. The datagram and the tunnel headers are encrypted. At modified step 506, receiver MPND 302 first decrypts the payload of the encapsulation packet to retrieve the datagram and the tunnel header. Then the core identity could be retrieved from the tunnel header.

In one variant, the core identity is not sent by receiver MPND 302 during step 501. Instead, a session-ID is sent by receiver MPND 302.

In one variant, there is no core identity sent by receiver MPND 302 during step 501. Instead, a session-ID is determined by MPND 301 and is sent to receiver MPND 302.

In another variant, the core identity is replaced by a session-ID and the session-ID is a hash value.

There is no limitation on the format, data-type or length of a session-ID as long it is able to uniquely identify a data session. For example, a session-ID may be, without limitation, in the format of plain-text alphanumeric, binary or hexadecimal.

FIG. 7 illustrates steps performed by a sender MPND and a receiver MPND according to one embodiment of the present invention. In this embodiment, similar to the embodiment illustrated in FIG. 5, the sender MNPD will assign a core identity for each packet to be sent to the receiver MPND. However not all encapsulation packets have the same core identity. Instead, core identity is determined mainly based on the data session of the datagram to be sent to the receiver MPND.

At step 701, a first MPND and a second MPND exchanges processor information during establishment of an aggregated tunnel. For illustration purpose only, the first MPND is MPND 301 and the second MPND 302 is MPND 302. Both MPND 301 and MPND 302 may be sender and receiver. The processor information includes number of cores each MPND has. For example, MPND 301 has one processing-unit and the processing-unit has four cores. MPND 301 informs MPND 302 that it has four cores. For example, MPND 301 has two processing-units and each processing-unit has eight cores. MPND 302 informs MPND 301 that it has sixteen cores. There is no limitation on representation of processor information and core information. The number of cores may be simply represented by four bits to represent one of the cores. For example, processor information may be in string, bytes or binary data.

In another example, the number of cores is represented by characters or strings. For illustration purpose only, MPND 301 may send "AA", "BB", "CC" and "DD" to MPND 302 as core identities for the four cores respectively. MPND 302 may send MPND 301 "core1", "core2", "core3", "core4", "core5", "core6", "core7", "core8", "core9", "core10", "core11", "core12", "core13", "core14", "core15", and "core16" as core identities for the four cores respectively.

Processor information may also include core selection criteria. For example, the core selection criteria is to select a core based on types of datagrams. For example, certain cores should not be used and/or certain cores are preferred to be used. The processor information may also be updated after the aggregated tunnel is established. In one example, when more cores are added or made available at a MPND, the MPND may update the other MPND about the number of cores.

At step 702, when sender MPND receives a datagram that is designated to a receiver MPND, processing-unit of the sender MPND identifies the data session that the datagram belongs to. There are myriad methods to identify a data session, such as those disclosed in step 103 of the embodiment illustrated by FIG. 1.

At step 703, sender MPND assigns a core to the datagram based on the data session. If the datagram is the first datagram in the data session, sender MPND may select one of the cores from the number of cores of receiver MPND. There are many ways to select the core. There is no limitation on the selection method. For example, sender MPND selects the core randomly. In another example, sender MPND selects core uniformly that the first data session uses the first core, the second data session uses the second core, and so on. If there are four cores, the fifth data session will use the first core again. In another example, any of the cores may be selected, except one or more non-selectable cores. The non-selectable cores may only be used for certain specific datagrams, such as high priority datagrams.

If the datagram is not the first datagram of the data session, sender MPND looks up for the core that is already assigned to data session.

At step 704, the core identity corresponding to the core assigned at step 703 and the datagram are encapsulated in one or more encapsulation packets. At step 705, sender MPND sends the one or more encapsulation packets to receiver MPND through the aggregated tunnel, which was already established at step 701.

The core identity may be in the form of a string, a number, a hash, a code or any data format that is recognizable by receiver MPND.

At step 706, receiver MPND receives the one or more encapsulation packets from sender MPND from the aggregated tunnel. At step 707, receiver MPND decapsulates the one or more encapsulation packets to extract the datagram and the core identity. At step 708, receiver MPND processes the datagram by using the core indicated by the core identity.

When more datagrams belonging to the same data session arrive later, those datagrams will also be assigned with the same core identity, i.e., the same core of receiver MPND, already assigned to the data session.

FIG. 8 illustrates steps performed by a sender MPND and a receiver MPND according to one embodiment of the present invention. In this embodiment sender MPND does not use any information related to the processor information of receiver MPND. Sender MPND encrypts the datagrams before sending them to receiver MPND. Receiver MPND decrypts the received datagrams and then determine corresponding cores to process the datagrams.

At step 801, sender MPND has a first datagram to be sent to receiver MPND. At step 802, the sender MPND selects one or more of the tunnels of an aggregated tunnel (which is already established between the two MPND) based on a tunnel selection criterion to send the first datagram to receiver MPND. The tunnel selection criterion is determined as described in step 103 of FIG. 1. At step 803, sender MPND encrypts the first datagram to create a payload for one or more encapsulation packets. At step 804, sender MPND creates an aggregated tunnel header corresponding to the aggregated tunnel.

At step 805, sender MPND encapsulates the payload and the aggregated tunnel header to create one or more encapsulation-packet. If the payload is small enough to be fit inside one encapsulation packet, only one encapsulation packet is required. Otherwise more encapsulation packets will be required. At step 806, sender MPND sends the one or more encapsulation packet to receiver MPND. At step 807, receiver MPND receives the one or more encapsulation packets from sender MPND. At step 808, receiver MPND decapsulates the one or more encapsulation packets to retrieve the datagram.

At step 809, receiver MPND decrypts the second datagram to retrieve the first datagram. At step 810, receiver MPND assigns the datagram to one of its cores based on a core selection criterion. The core selection criterion is to first identify the data session the datagram belongs to. Datagrams belonging to the same data session are processed by the same core. Secondly, if the datagram is the first datagram of a new data session, receiver MPND selects a core to process the datagram. Therefore, when a session identifier has not been received before by receiver MPND, the datagram encapsulated in the encapsulation packet with the session identifier is the first datagram of the session. There is no limitation on the method of selection. For example, the selection may be based on core availability or core loading. The core may also be selected randomly or sequentially. In another example, any of the cores may be selected, except one or more non-selectable cores. The non-selectable cores may only be used for certain specific datagrams, such as high priority datagrams.

The core selected and the session identifier are stored for later look-up.

If the first datagram belongs to a data session already identified, receiver MPND selects a core that is already selected for the data session to process the first datagram. When the session identifier was received, processing unit of receiver MPND is able to determine which data session the first datagram belongs to. The core may be looked up by using the session identifier.

FIG. 9 illustrates steps performed by a sender MPND and a receiver MPND according to one embodiment of the present invention. In this embodiment, receiver MPND does not need to decrypt the datagrams in order to select the core to process the datagrams. Instead, an unencrypted session-ID is used for that purpose. As discussed before, there is no limitation on the format, data-type or length of a session-ID as long it is able to uniquely identify a data session. Additionally, in this embodiment, the whole datagrams may be encrypted, only parts of the datagrams may be encrypted or the datagrams may not be encrypted at all. A session-ID for a datagram is used to identify a particular data session (such as, but not limited to, a TCP data session) that the particular datagram belongs to. Datagrams belonging to different data sessions are assigned with different session-IDs. Receiver MPND may directly retrieve the session-ID without decryption and select a core based on the session-ID to process the datagram.

At step 901, sender MPND has a first datagram to be sent to receiver MPND. At step 902, sender MPND creates a session-ID based on a data session identification process for the data session the first datagram belongs to. The data session identification process is determined as described in step 103 of FIG. 1. At step 903, sender MPND selects one or more of the tunnels of an aggregated tunnel based on a tunnel selection criterion to send the first datagram to the receiver MPND. There is no limitation on the tunnel selection criterion. For example, one or more tunnels may be selected according to tunnel bandwidth, tunnel latency, tariffs of using an access network that one or more tunnels used, and/or geographical location of the sender MPND.

At step 904, sender MPND creates an aggregated tunnel header corresponding to the aggregated tunnel. The aggregated tunnel header comprises tunnel information, such as tunnel identification tunnel sequence number and global sequence number, and session-ID. The first datagram and aggregated tunnel header are then stored in the payload of a first encapsulation packet. There is no limitation that the session-ID must be stored in the aggregated tunnel header. For example, the session-ID may instead be stored in a section of the payload of the encapsulation packet but not in the aggregated tunnel header. Sender MPND may or may not encrypt the aggregated tunnel header.

Sender MPND also encapsulates the first datagram in the payload of the first encapsulation packet. Depending on configuration, the first datagram may or may not be encrypted by the sender MPND.

In one variant, the session-ID is stored in the header of the first encapsulation packet. In this embodiment, session-ID is not encrypted regardless if it is in the header of first encapsulation packet, in an aggregated tunnel header or in a section of the payload. This will allow receiver MPND to retrieve the session-ID without decryption at step 908.

At step 905, sender MPND sends the first encapsulation packet through the aggregated tunnel. As the aggregated tunnel is composed of a plurality of tunnels, the encapsulation packet is sent through a tunnel selected at step 903. In the case that the first datagram is fragmented into a plurality of first encapsulation packets, there is no limit that all the plurality of first encapsulation packets must be sent through the same tunnel.

At step 906, receiver MPND receives the first encapsulation packet from the sender MPND through the aggregated tunnel.

At step 907, receiver MPND decapsulates the first encapsulation packet to retrieve the first datagram and the session-ID. If the first datagram is encrypted when being placed in the payload of the first encapsulation packet at step 904, decryption will be performed to retrieve the first datagram. As the session-ID is not encrypted, receiver MPND is capable of retrieving the session-ID without decryption. This may allow receiver MPND to identify the session-ID quicker comparing to if the session-ID is encrypted.

At step 908, receiver MPND assigns the first datagram to one of its cores corresponding to the session-ID. There is no limitation on the method receiver MPND may use to select the core based on the session-ID. The selection criterion is similar to, but not identical, the core selection criterion at step 810 in the embodiment illustrated in FIG. 8. The selected core and the session-ID may be stored for lookup. For example, the selected core and session-ID pair information is stored in a database or text file.

It is preferred to process datagrams corresponding to the same session-ID by the same core. Receiver MPND selects a core to process the datagram based on the session-ID. There is no limitation on the method of selection. For example, the selection may be based on core availability or core loading. The core may also be selected randomly or sequentially. In another example, any of the cores may be selected, except one more non-selectable cores. The non-selectable cores may only be used for certain specific datagrams, such as high priority datagrams. The selection at this step is similar to the core selection performed at step 703.

If receiver MPND has already receive an encapsulation packet having the same session-ID, this implies that one or more datagrams of the data session corresponding to the session-ID have already been received. Receiver MPND selects a core that is already selected for the session-ID to process the first datagram. Receiver MPND may lookup for the core that is already assigned for the session-ID. For example, receiver MPND may lookup for the core, using a text file, based on the session-ID.

In one variant, session-ID is replaced by cored identity. At step 902, sender MPND selects a core of the receiver MPND and then use the core identity, instead of a session-ID, to inform receiver MPND the core to be used to process the first datagram. Therefore, in step 904 and 907, session-ID is replaced by the core identity. At step 908, as the core to be used to process the first datagram is already indicated by the core identity, there is no need to store the core-ID. There is also no need to perform a core lookup based on the core identity.

When core identity is used, sender MPND should receive processor information from the receiver MPND as discussed in step 701. Then sender MPND will select a core for datagrams belonging to the same data session. The core identity corresponding to the core is encapsulated along with the datagram.

For example, for illustration purpose only, the session identifier is represented as "A3B8F20A88C23EB" in hexadecimal format. The first-time receiver MPND receives a datagram with this session identifier, processing unit of receiver MPND assigns a core, for example, core-12, to process the datagram. From then on, whenever receiver MPND receives an encapsulation packet with session identifier "A3B8F20A88C23EB", the processing unit will use core-12 to process the datagrams in the encapsulation packets.

FIG. 10 illustrates steps performed by a sender MPND and a receiver MPND 302 according to one variant of the embodiment illustrated by FIG. 9. Compared to the embodiment illustrated by FIG. 9, in this particular variant the session-ID is included with the aggregated tunnel header instead of being included with the first datagram. At step 1001, sender MPND 301 has a first datagram to be sent to receiver MPND 302. At step 1002, sender MPND creates a session-ID based on at least one first criterion for the data session the first datagram belongs to. The at least one first criterion is determined as described in step 103 of FIG. 1. In one variant of this embodiment, sender MPND 301 does not create a session-ID, but rather determines a session-ID for the data session the first datagram belongs to. At step 1003, sender MPND 301 selects one or more of the tunnels of an aggregated tunnel (which is already established between the two MPNDs) based on at least one second criterion to send the first datagram to receiver MPND 302. The at least one second criterion may include, without restriction, the at least one first criterion. At step 1004, sender MPND 301 creates an aggregated tunnel header corresponding to the aggregated tunnel. At step 1005, sender MPND 301 includes the session-ID in the aggregated tunnel header. At step 1006, sender MPND 301 encapsulates the first datagram with the aggregated tunnel header to create a first encapsulation-packet. At step 1007, sender MPND 301 sends the first encapsulation-packet to receiver MPND 302. At step 1008, receiver MPND 302 receives the encapsulation-packet from sender MPND 301. At step 1009, receiver MPND 302 decapsulates the first encapsulation-packet to retrieve the first datagram. At step 1010, receiver MPND 302 retrieves the session-ID from the aggregated tunnel header. At step 1011, receiver MPND 302 assigns the first datagram to one of its cores corresponding to the session-ID as described in step 908 of FIG. 9.

Although the embodiments described in the present invention are directed towards multi-core MPNDs, one of ordinary skill in the art would appreciate that the techniques described herein are not only applicable to multi-core MPNDs, rather any multiprocessing computing system including, but not limited to, multi-processing systems, multicore systems, manycore systems.

BRIEF DESCRIPTION OF DRAWINGS

FIG. 10 illustrates a flowchart of processes being performed according to one of the embodiments of the present invention.

Figure 1:
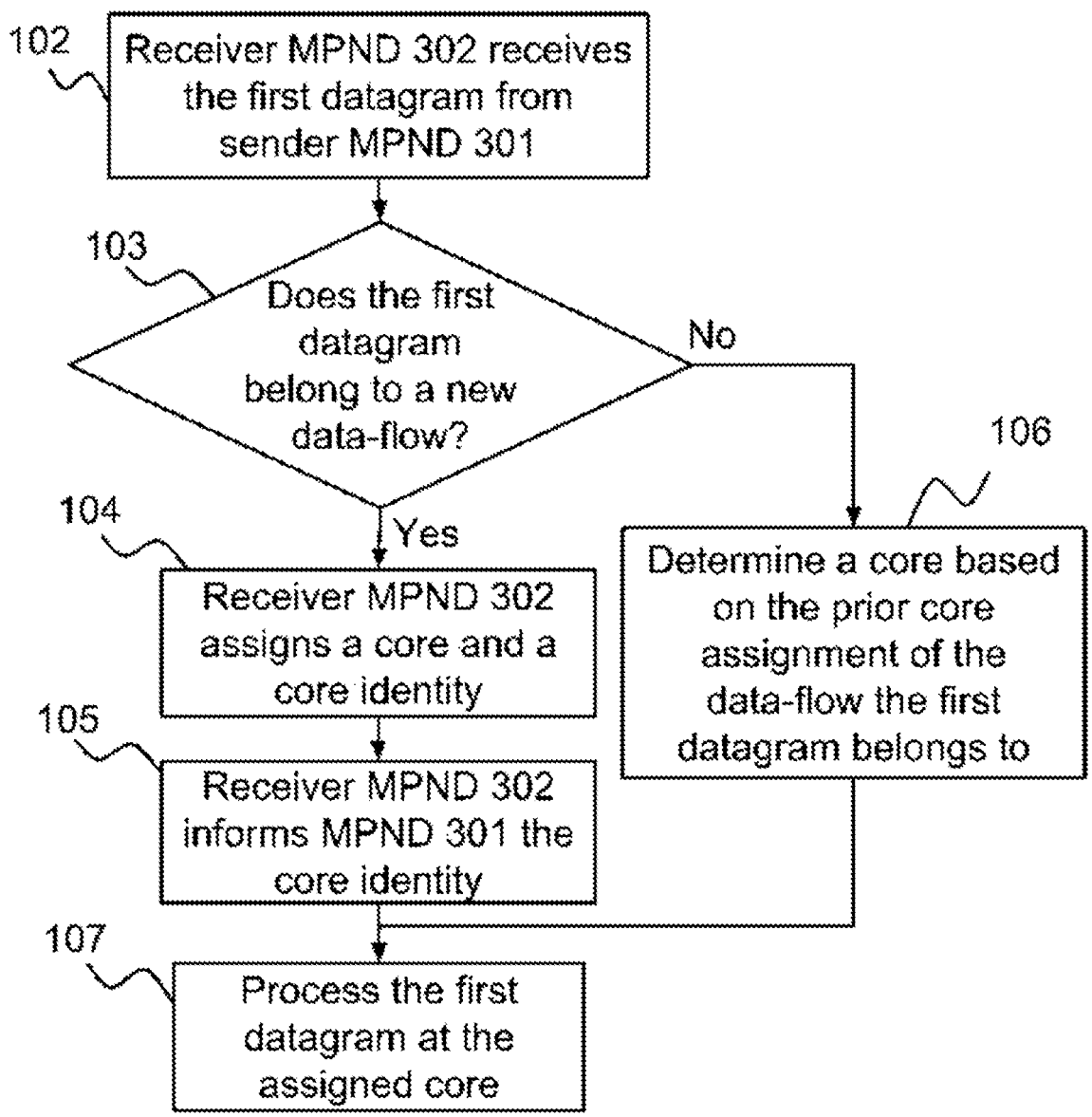
FIG. 1 illustrates a flowchart of processes being performed according to one of the embodiments of the present invention.
Figure 2:
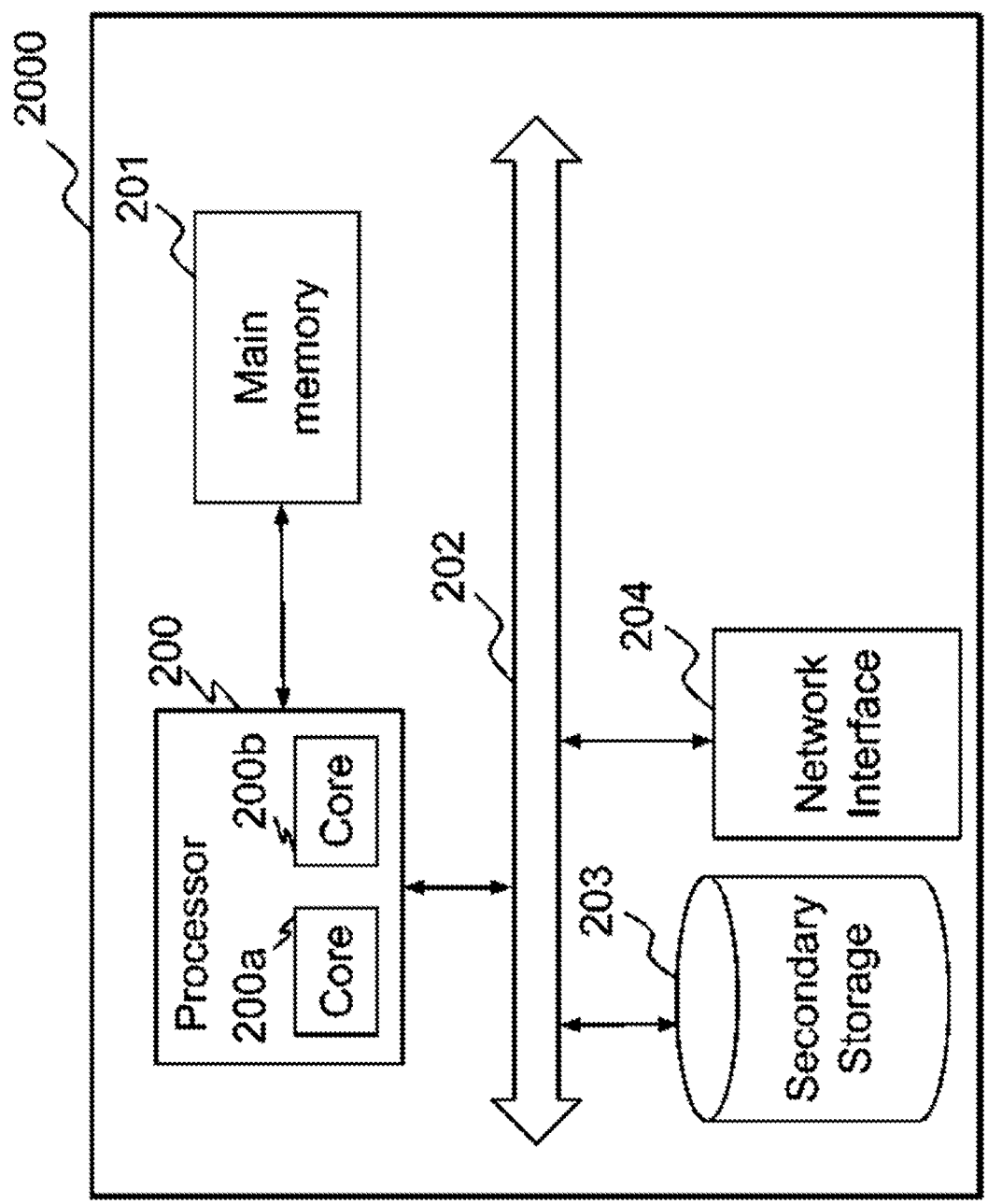
FIG. 2 illustrates a block diagram of communication device according to one of the embodiments of the present invention.
Figure 3:
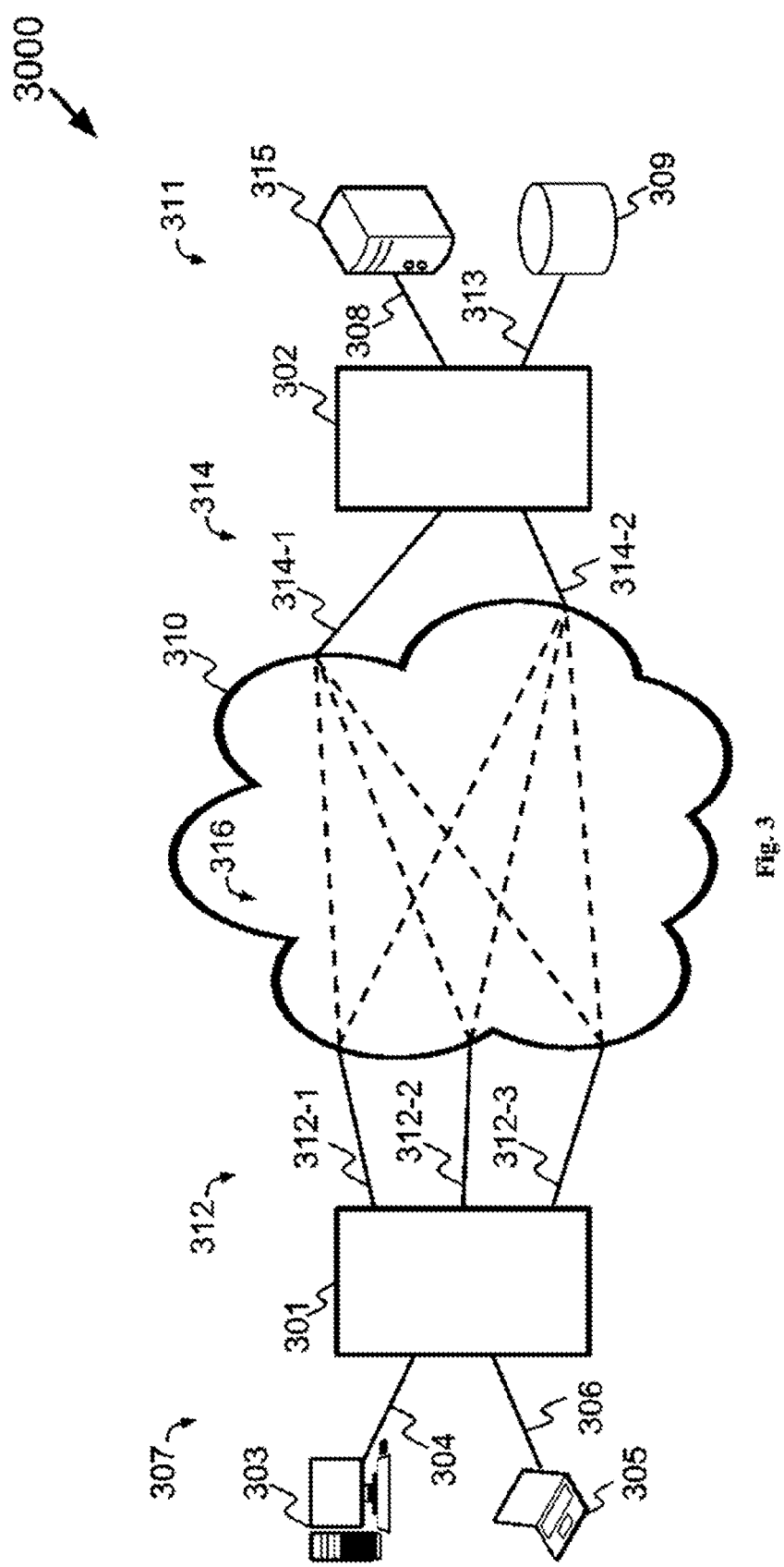
FIG. 3 illustrates a network environment according to one of the embodiments of the present invention.
Figure 4:
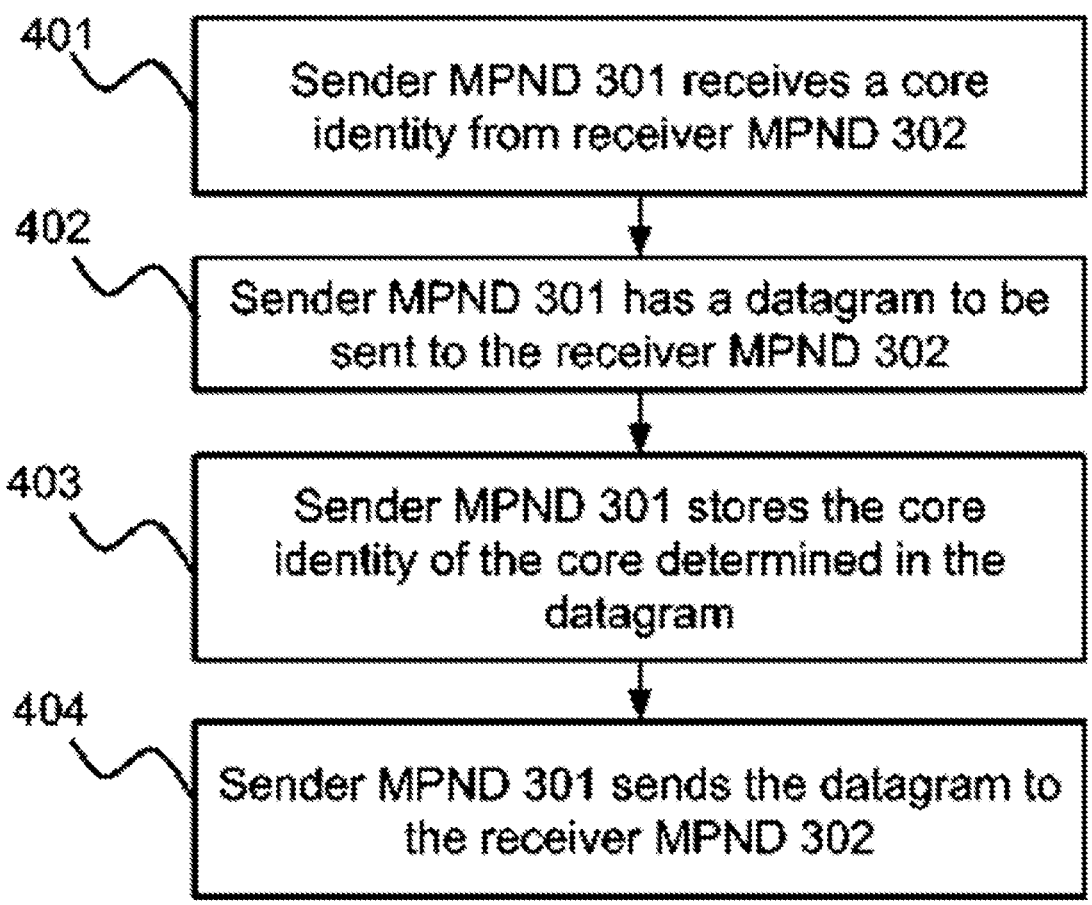
FIG. 4 illustrates a flowchart of processes being performed according to one of the embodiments of the present invention.
Figure 5:
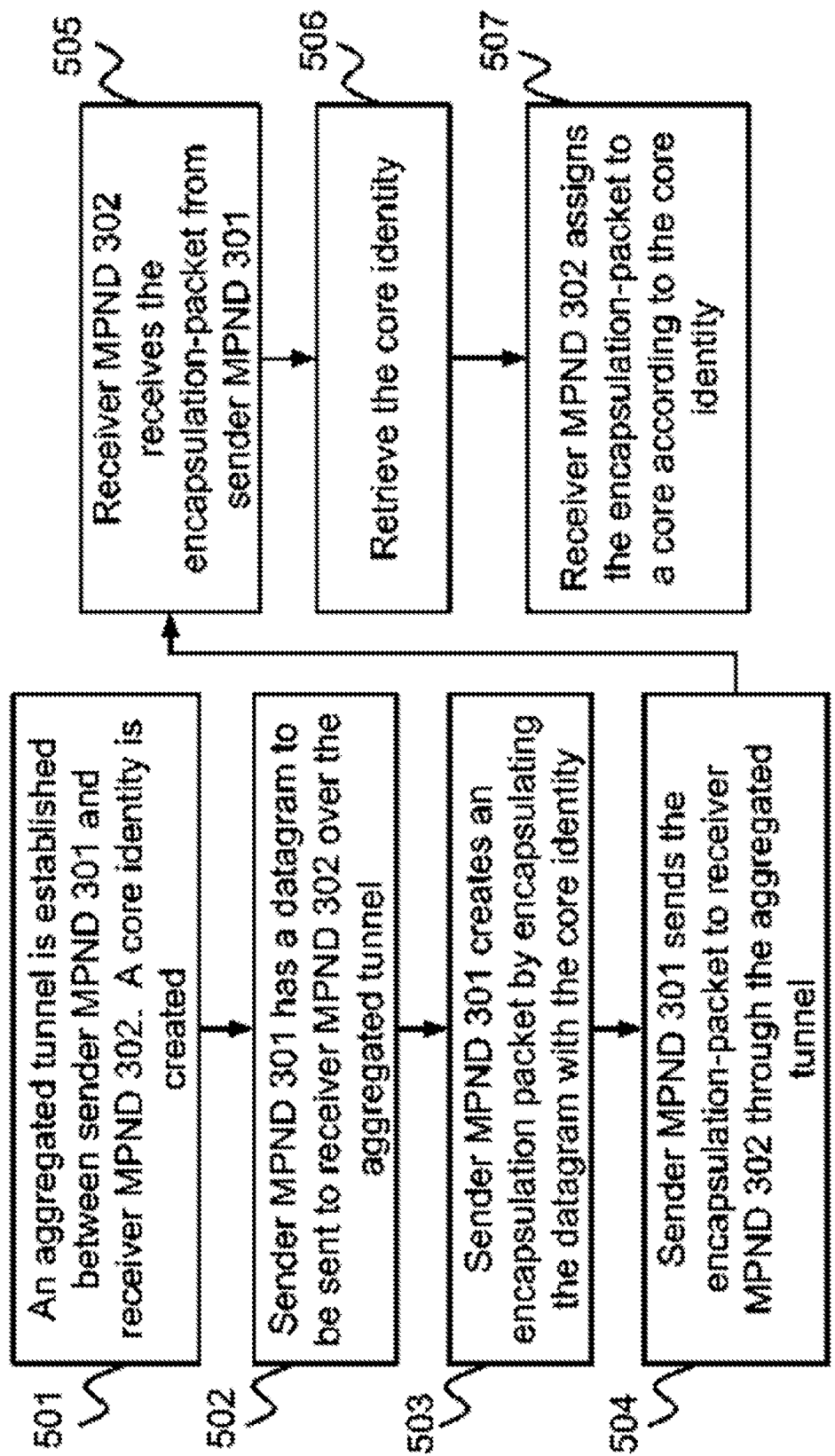
FIG. 5 illustrates a flowchart of processes being performed according to one of the embodiments of the present invention.
Figure 6:
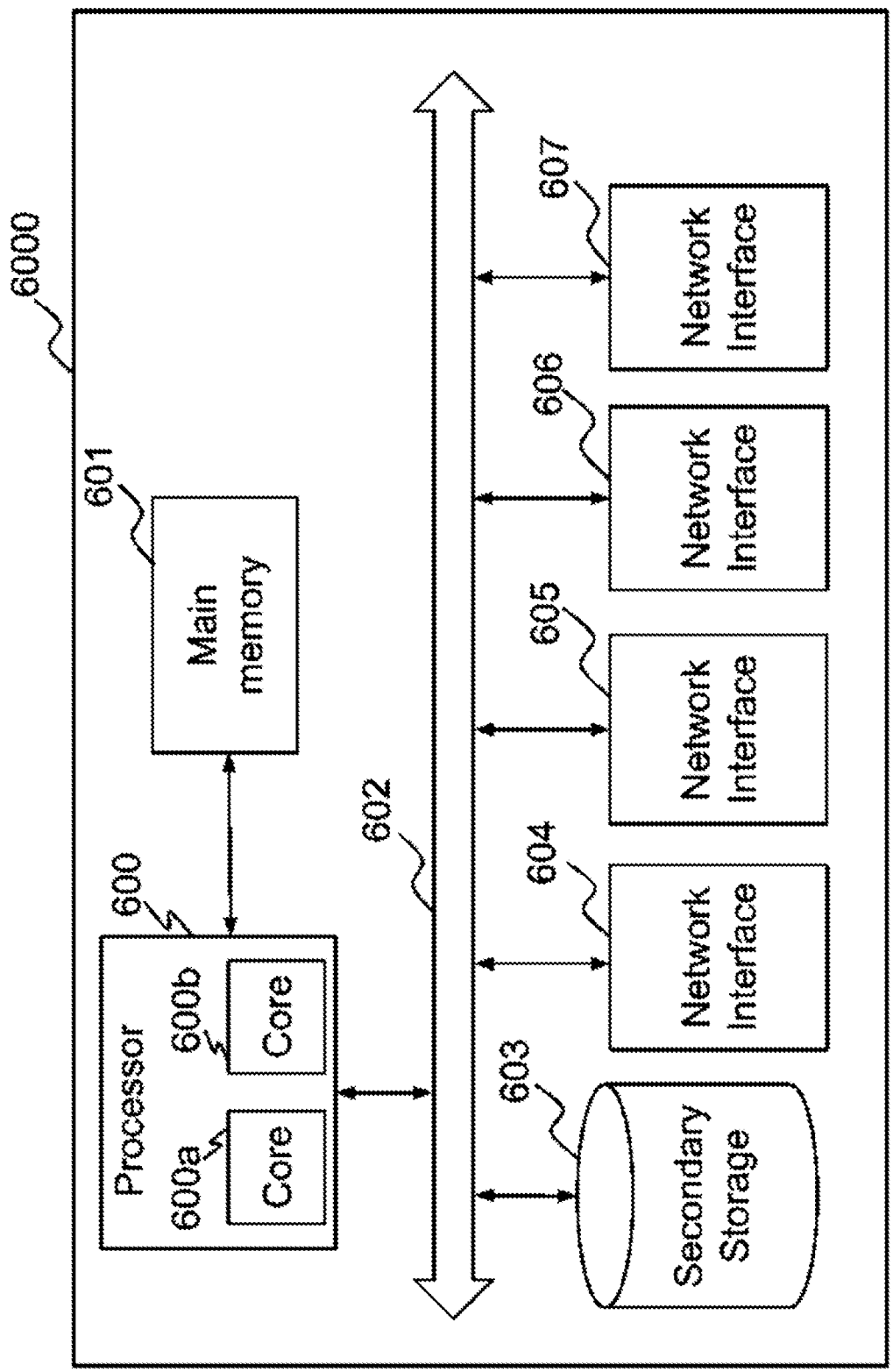
FIG. 6 illustrates a block diagram of communication device according to one of the embodiments of the present invention.
Figure 7:
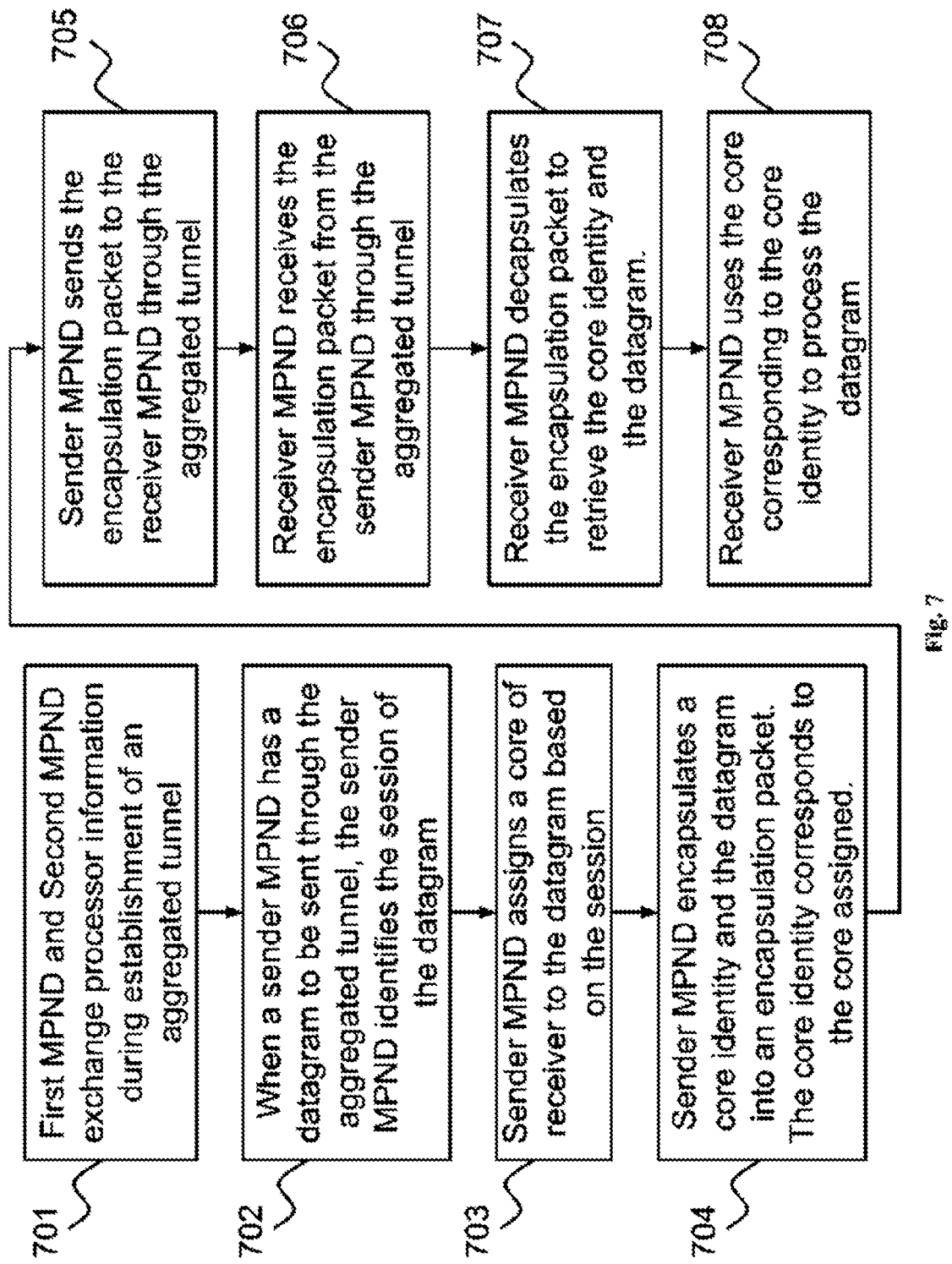
FIG. 7 illustrates a flowchart of processes being performed according to one of the embodiments of the present invention.
Figure 8:
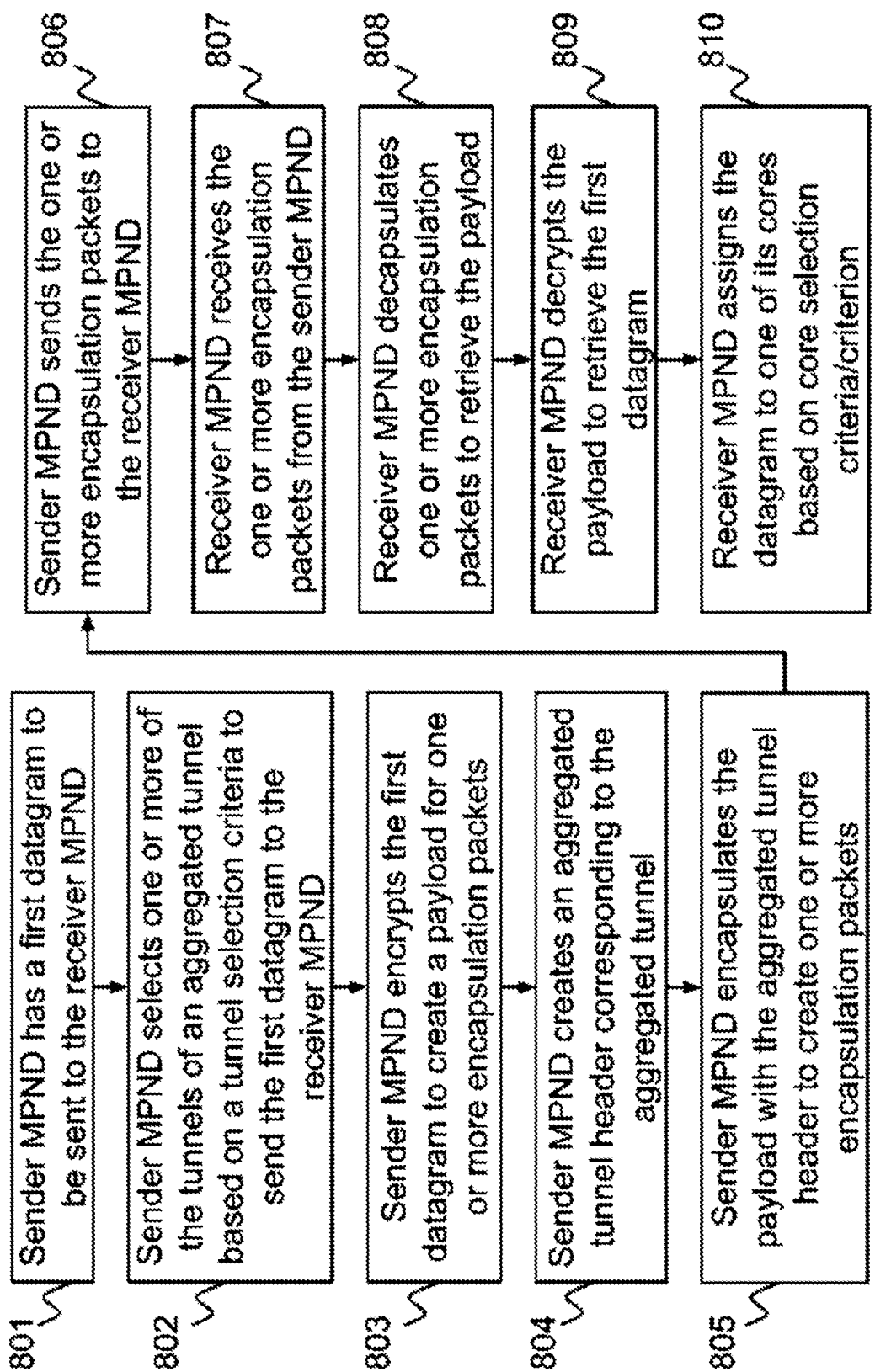
FIG. 8 illustrates a flowchart of processes being performed according to one of the embodiments of the present invention.
Figure 9:
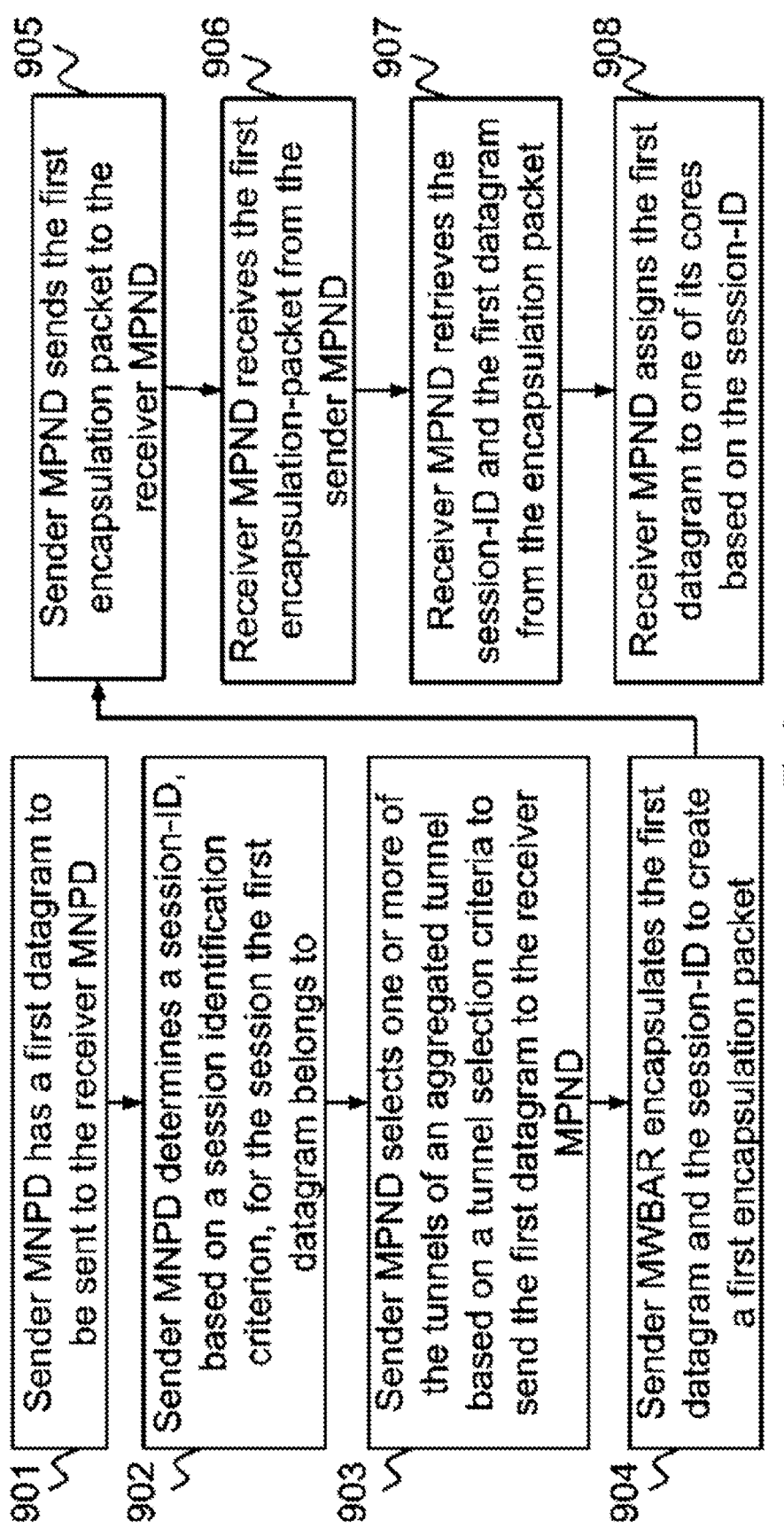
FIG. 9 illustrates a flowchart of processes being performed according to one of the embodiments of the present invention.

The invention claimed is:

1. A method performed at a first network device for sending packets to a second network device, comprising:
   (a) receiving a datagram for sending the datagram to the second network device;
   (b) selecting, based on a tunnel selection criterion, at least one tunnel;
   (c) creating a payload with the datagram by encrypting the datagram;
   (d) creating an aggregated tunnel header corresponding to an aggregated tunnel;
   (e) encapsulating a core identity, the payload and the aggregated tunnel header to create one or more encapsulation-packets; and
   (f) sending the one or more encapsulation-packets to the second network device via the at least one tunnel;
   wherein:
      the aggregated tunnel comprises a plurality of tunnels and the at least one tunnel is in the plurality of tunnels;
      the second network device decrypts the payload to retrieve the datagram;
      the datagram is assigned with a core based on a data session associated with the datagram and the core is associated with the core identity;
      the data session of the datagram is determined according to a data session identification process; and
      the core identity is received by the first network device from the second network device when the aggregated tunnel is established.

2. The method of claim 1, wherein the core identity is in a form of one of: a string, a number, a code, and a data format recognizable by the first network device and the second network device.

3. The method of claim 1, wherein:
   the data session identification process is based on at least one of: the core identity, a source Internet Protocol (IP) address, a destination IP address, a source port number, a destination port number, a connection-state, a payload-content, a quality of service (QoS) requirement of applications, time and data, user-ID, bandwidth, and latency or hop-count of connected links; and
   the second network device decapsulates the one or more encapsulation-packets to retrieve the core identity.

4. The method of claim 1, wherein:
   the core is in a plurality of cores of a processing unit of the second network device; and
   the core is selected based on the core identity to process the datagram.

5. The method of claim 4, wherein the core is selected based on core availability or core loading.

6. The method of claim 4, wherein:
the second network device assigns the datagram to the core based on a core selection criterion; and
the core selection criterion identifies the data session to which the datagram belongs.

7. The method of claim 6, wherein the core is used to process a plurality of datagrams belonging to the data session.

8. The method of claim 1, wherein the tunnel selection criterion is based on at least one of: a tunnel bandwidth, a tunnel latency, a tariff of using an access network by a tunnel, and a geographical location of the first network device.

9. The method of claim 1, wherein the plurality of tunnels are established between the first network device and the second network device.

10. The method of claim 1, wherein the plurality of tunnels are aggregated together to form the aggregated tunnel.

11. A first network device for sending packets to a second network device, the first network device comprising:
at least one network interface;
at least one processing unit; and
at least one non-transitory computer readable storage medium for storing program instructions executable by the at least one processing unit for:
(a) receiving a datagram for sending the datagram to the second network device;
(b) selecting, based on a tunnel selection criterion, at least one tunnel;
(c) creating a payload with the datagram by encrypting the datagram;
(d) creating an aggregated tunnel header corresponding to an aggregated tunnel;
(e) encapsulating, a core identity, the payload and the aggregated tunnel header to create one or more encapsulation-packets; and
(f) sending the one or more encapsulation-packets to the second network device via the at least one tunnel;
wherein:
the aggregated tunnel comprises a plurality of tunnels and the at least one tunnel is in the plurality of tunnels;
the second network device decrypts the payload to retrieve the datagram;
the datagram is assigned with a core based on a data session associated with the datagram and the core is associated with the core identity;
the data session of the datagram is determined according to a data session identification process; and
the core identity is received by the first network device from the second network device when the aggregated tunnel is established.

12. The first network device of claim 11, wherein the core identity is in a form of one of: a string, a number, a code, and a data format recognizable by the first network device and the second network device.

13. The first network device of claim 11, wherein:
the data session identification process is based on at least one of: the core identity, a source Internet Protocol (IP) address, a destination IP address, a source port number, a destination port number, a connection-state, a payload-content, a quality of service (QoS) requirement of applications, time and data, user-ID, bandwidth, and latency or hop-count of connected links; and
the second network device decapsulates the one or more encapsulation-packets to retrieve the core identity.

14. The first network device of claim 11, wherein:
the core is in a plurality of cores of a processing unit of the second network device; and
the core is selected based on the core identity to process the datagram.

15. The first network device of claim 14, wherein the core is selected based on core availability or core loading.

16. The first network device of claim 14, wherein:
the second network device assigns the datagram to the core based on a core selection criterion; and
the core selection criterion identifies a data session to which the datagram belongs.

17. The first network device of claim 16, wherein the core is used to process a plurality of datagrams belonging to the data session.

18. The first network device of claim 11, wherein the tunnel selection criterion is based on at least one of: a tunnel bandwidth, a tunnel latency, a tariff of using an access network by a tunnel, and a geographical location of the first network device.

19. The first network device of claim 11, wherein the plurality of tunnels are established between the first network device and the second network device.

20. The first network device of claim 11, wherein the plurality of tunnels are aggregated together to form the aggregated tunnel.

* * * * *